Aug. 21, 1962　　　H. C. FRENTZEL　　　3,049,943
DIFFERENTIAL

Filed Aug. 13, 1959　　　　　　　　　　2 Sheets-Sheet 1

INVENTOR.
Herman C. Frentzel
BY
Attorney

Aug. 21, 1962 H. C. FRENTZEL 3,049,943
DIFFERENTIAL
Filed Aug. 13, 1959 2 Sheets-Sheet 2
FIG. 3
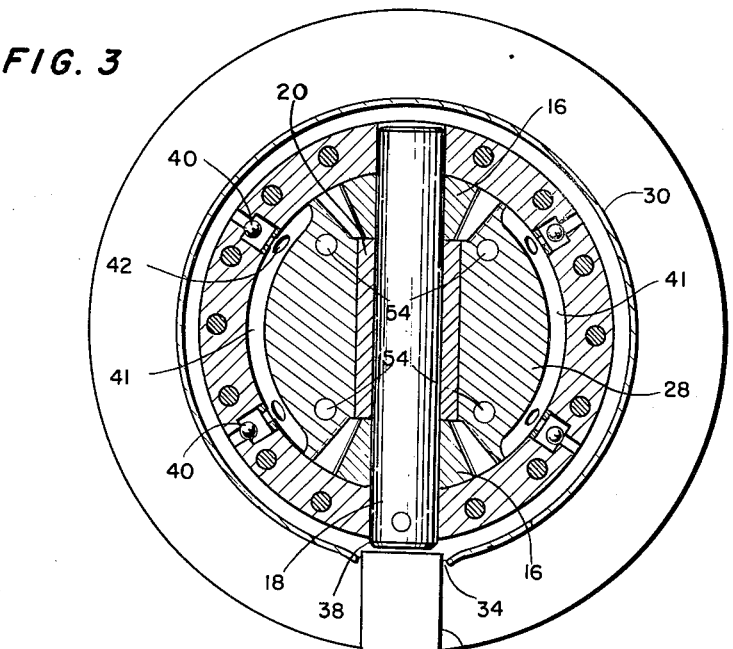
FIG. 4
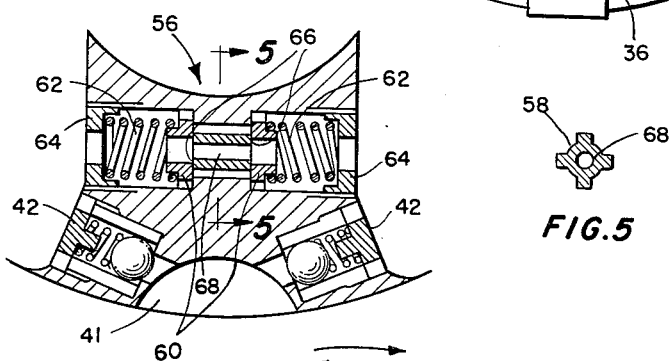
FIG. 5
FIG. 6
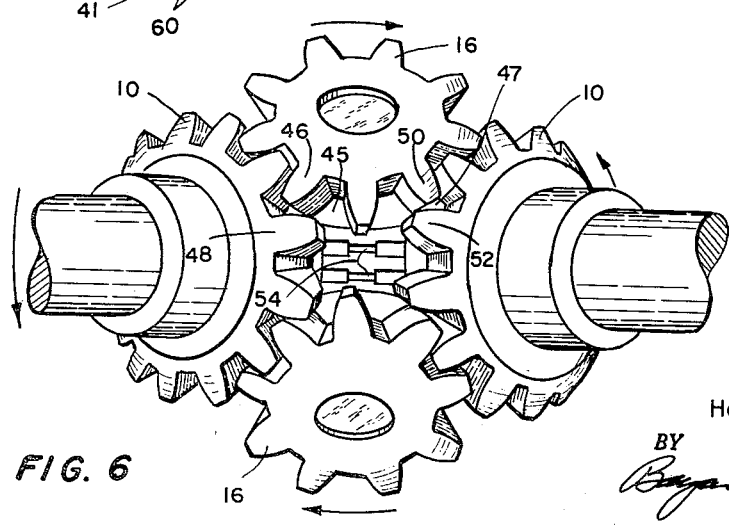
INVENTOR.
Herman C. Frentzel
BY
Attorney

United States Patent Office 3,049,943
Patented Aug. 21, 1962

3,049,943
DIFFERENTIAL
Herman C. Frentzel, % Frentzel Engineering Company,
125 W. Melvina St., Milwaukee 12, Wis.
Filed Aug. 13, 1959, Ser. No. 833,546
8 Claims. (Cl. 74—711)

This invention relates to automotive differentials of the type commonly referred to as non-slip differentials which insure delivery of power to both wheels.

Differentials in automobiles are designed primarily to compensate for the difference in torque on each wheel while turning. Whenever a situation is encountered where there is no traction on one wheel or excessive traction on the other wheel, the maximum driving force will be that which can be transmitted by the wheel having the least traction. All efforts to alleviate this problem have been aimed at adding complicated gearing or block brake discs to the differential which automatically feed back part of the driving force to the wheel having the greater amount of traction. These devices have proven costly and require major alterations to the conventional differential before they can be adapted for use.

The primary object of this invention is to provide a simple, relatively low cost, non-slip differential. This is done by utilizing a hydraulic differential described hereinafter to control the power distribution between the wheels.

The hydraulic differential normally tends to lock and a secondary object is to provide means for regulating the locking action to obtain the desired performance characteristics.

A further object of this invention is to provide a hydraulic differential which can be substituted for the conventional differential or the conventional differential can be readily modified to provide the present hydraulic differential.

FIGURE 3 is taken on line 3—3 of FIGURE 2 showing an end view of the present invention.

FIGURE 4 is a sectional view of the pressure regulating means.

FIGURE 5 is taken on line 5—5 showing the pressure regulator valve.

FIGURE 6 is a schematic of the present invention.

Figure 1:
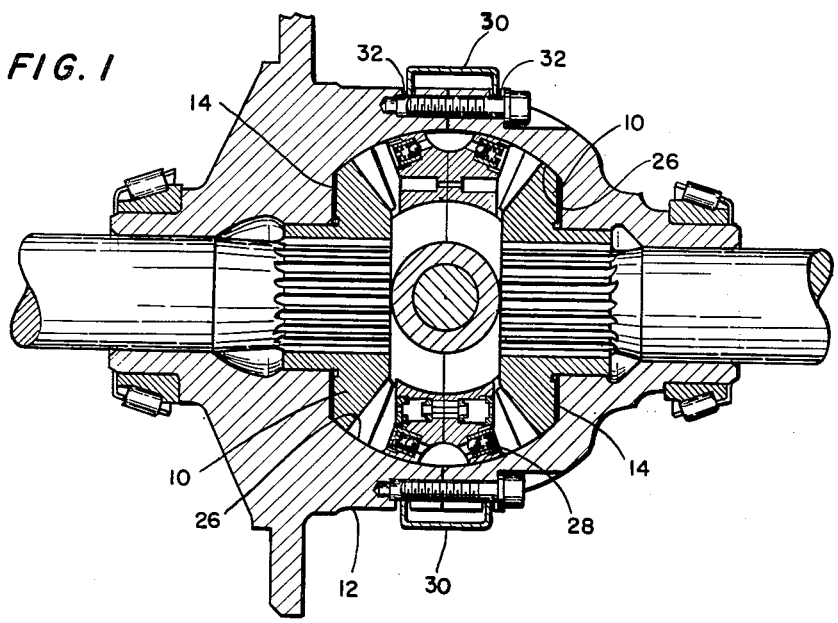
FIGURE 1 is a side elevation of the present invention partly in section.
Figure 2:
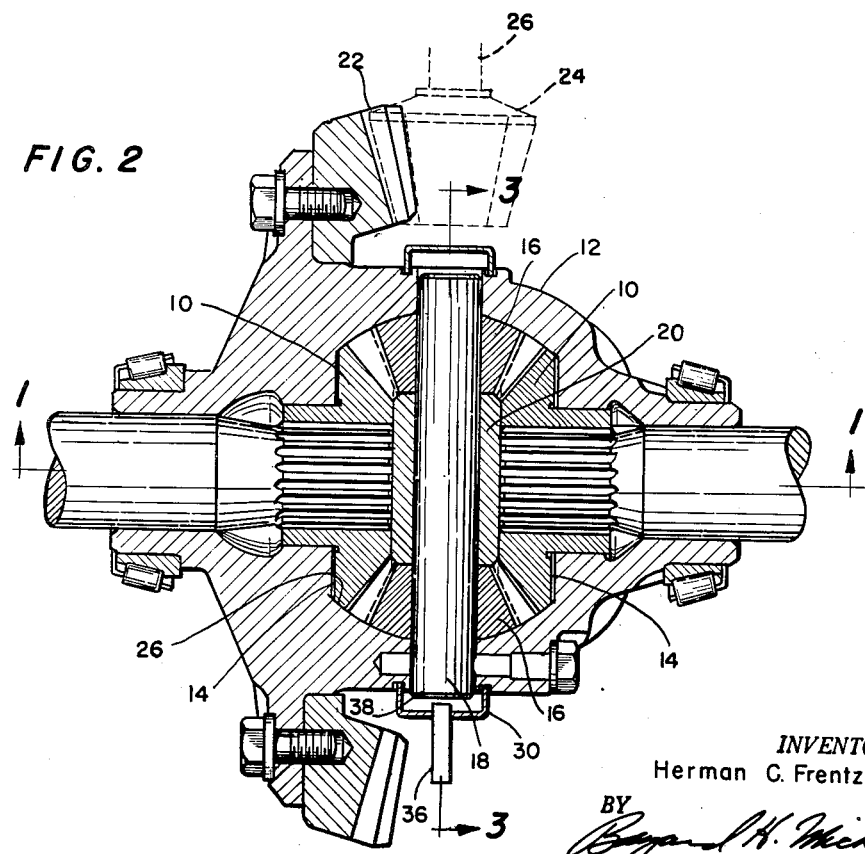
FIGURE 2 is a plan view partly in section of the present invention.

The present invention is used with a differential similar to the standard differential used in present day cars and includes a pair of driven gears 10 coaxially journaled in a split housing 12 on bearing surfaces 14. The driven gears mesh with a pair of pinion gears 16 mounted to rotate on a shaft 18 which is secured to the housing in sleeve 20. The pinion shaft 18 is secured to the housing with its axis transverse to the axis of the driven gears so that upon rotation of the housing on the driven gear axis the pinion gears will transmit an equal driving force to each driven gear. A gear ring 22 is secured to the exterior of the housing and is driven by gear 24 on the end of drive shaft 26 to rotate the housing.

In the normal construction the pinion and driven gears are positioned within an open chamber so that a lubricant can circulate freely between them. In the present invention the pinion and drive gears are each positioned in a separate cavity 26 in the housing. Inner block 28 is positioned within the housing to separate the gear cavities and provide a separate chamber in which each gear is free to rotate. For proper operation of the device it is essential that the gear cavities be completely filled with oil. Since the conventional differential is only partially submerged in oil, a U-shaped annular ring 30 mounted on the housing is used as a reservoir to keep the cavities filled with oil. The ring is slidably positioned in grooves 32 and is provided with aperture 34 which communicates with the oil sump. Ring 30 is prevented from rotating by stationary plate 36 which projects into aperture 34 holding the aperture in a "down" or "oil" position. When the housing is rotated, end 38 of the pinion shaft extends into the ring reservoir and acts as an impeller as it rotates through the ring forcing oil from the passage around the ring. Any air which may be trapped in the ring will be forced out the space between aperture 34 and passage 36. The reservoir is connected to grooves 41 through one way valves 40 and will supply liquid to the groove whenever a pressure differential exists between them. A second one way valve 42 connects groove 41 with the areas of engagement and disengagement of the gear teeth providing liquid to these areas whenever a suction pressure is created therein through hydraulic leakages.

Looking at FIGURE 6 and primarily at the central portion, assuming the left hand gear is spinning counter-clockwise as indicated by the arrow, a high pressure area will build up in space 45 between engaging teeth 46 and 48. Simultaneous with the build up of pressure in space 45, a low pressure area will exist in space 47 between disengaging teeth 50 and 52. If block 28 isolates these areas and hydraulic leakages are low, the pressure in space 45 will build up to a high hydraulic pressure preventing further differential action and even assuring traction if one wheel is free.

By providing by-pass orifice 54 in block 28, connecting space 45 on the left hand side of the inner block and space 47 horizontally disposed on the right hand side of the inner block, hydraulic lock will not occur under normal differential action, such as cornering. In effect this raises the speed of differential action at which hydraulic lock will occur and is dependent on the size of the orifice and the temperature and viscosity of the fluid.

Whenever differential action occurs between the gears, there will be four areas where the teeth will be engaging creating high pressure areas and four areas where the teeth will be disengaging creating low pressure areas. As seen in FIGURE 6 a high pressure area will always be horizontally disposed on the opposite side of the inner block from a low pressure area regardless of the direction of rotation of the gears. A by-pass orifice is therefore provided between each horizontally disposed high and low pressure area to allow some hydraulic leakage to occur for normal low speed differential action.

A fixed orifice provides a means for raising the speed of differential action at which hydraulic lock will occur. Since the viscosity of the fluid used in the differential varies with the ambient temperature, the speed of differential action at which hydraulic lock will occur will vary with the viscosity and temperature. To compensate for this variation a valve arrangement (FIGURE 4) may be placed in the orifice so that hydraulic lock will always occur at approximately the same speed of differential action regardless of the viscosity of the fluid or the ambient temperature. The valve includes spool 58 positioned in the orifice between annular valve discs 60 seated on the outlets of the orifice. The discs are biased to close the passages on the outside of spool 58 by spring 62 which are held down by covers 64. When the hydraulic pressure builds up on one side of the orifice it acts on the end shoulder or surface 66 of the spool forcing the spool against the opposite disc, opening the valve and allowing oil to flow through the passages on the outside of the spool. This same condition exists if the pressure is on the opposite side of the inner block in which case spool 58 would move in the other direction raising the other disc.

With this valve arrangement, regulation of hydraulic lock is accomplished in either direction of rotation of the pinion gears. The valve also acts as a cushion providing a progressive build up of hydraulic pressure in the differential so that differential action is slowed down gradually rather than a relatively abrupt stopping of differential action resulting from the use of a fixed orifice. In some cases it may be desirable to provide a fixed orifice 68 in the spool so that at slow differential speeds the oil can flow from one side of the block to the other without appreciable pressure differential or creation of torque through the gearing.

From the above description it can be seen that by a simple addition of an inner block with the orifices or valves to a standard differential, it is possible to control a car better on icy surfaces and also to have two wheel traction regardless of the friction beneath either of the drive wheels. There will be practically no hydraulic resistance to differential action when such action is slow, such as turning a corner or going swiftly around a large radius turn. This can be controlled or varied as the particular application requires. Other differentials now on the market include blocking brake discs, complicated gearing and are not readily adaptable to present differentials.

Although but a few embodiments of the present invention have been illustrated and described, it will be apparent to those skilled in the art that various changes and modifications may be made therein without departing from the spirit of the invention or from the scope of the appended claims.

I claim:

1. A differential for an automotive vehicle comprising, a rotatable housing, rotatable axles extending into the housing, driven gears positioned within the housing and secured to the ends of the axles, pinion gears rotatably carried by the housing and meshing with the driven gears, a single block positioned within the housing and defining areas of engagement and disengagement between the teeth of the pinion and driven gears, an annular enclosed reservoir mounted to slide on the housing in the plane of rotation of the axis of the pinion gears, means for supplying hydraulic liquid to the reservoir, means for transferring the liquid from the reservoir to the areas of disengagement when relative rotation occurs in the differential, and means in the block for regulating pressure difference between each of the areas of engagement and a corresponding area of disengagement so that the differential will provide some driving force to both axles at all times.

2. A device according to claim 1 in which the regulating means includes a two way spring biased valve so that differential action is controlled in either direction of rotation.

3. A device according to claim 2 in which the two way valve is provided with an orifice so that differential action is unaffected at low speeds of operation.

4. A differential for an automotive vehicle comprising, a rotatable housing, rotatable axles extending into the housing, driven gears positioned within the housing and secured to the ends of the axles, a shaft journaled in the housing transverse to the axis of the axles, pinion gears mounted on the shaft and meshing with the driven gears, unitary means within the housing separating the areas of engagement and disengagement of the gear teeth, an annular stationary reservoir mounted to slide on the housing in the plane of rotation of the shaft, means for supplying liquid to the lower portion of the reservoir, one end of said shaft rotating through the reservoir forcing liquid from the lower portion of the reservoir to the upper portion of the reservoir to maintain the reservoir full of liquid, and means for transferring the liquid to the areas of disengagement including an intermediate reservoir and means for regulating pressure differential between each of the areas of engagement and a corresponding area of disengagement so that differential action is prevented through hydraulic lock at high speeds of differential action.

5. A device according to claim 4 in which the separating means includes means for regulating the pressure between each of the areas of engagement and a corresponding area of disengagement.

6. A differential for an automobile vehicle comprising, a rotatable housing having two sets of gear chambers therein, rotatable axles extending into the housing, driven gears positioned in one set of chambers and secured to the ends of the axles, pinion gears carried by the housing in the other set of chambers and meshing with the driven gears, means for supplying a hydraulic liquid to the gear chambers, an integral inner block separating the chambers from each other so that high and low pressure areas are created in the areas of engagement and disengagement of the gear teeth, each high pressure area being horizontally disposed on the opposite side of the inner block from a low pressure area, said high pressure areas retarding differential action so that rotary motion is delivered to each axle, said high and low pressure areas reversing each time the direction of rotation of the pinion gears is reversed, and passage means connecting the high pressure areas from the low pressure areas, said passage means includes a two way valve having a spool centrally positioned in the passage, means biased into engagement with each end of the spool closing the passage means, said means biased into engagement with each end of the spool having central apertures so that the end of the spool is in communication with the liquid in the passage, said spool opening one of said biased means in response to hydraulic pressure at the end remote from the opened biased means providing a gradual slowing down of differential action as the difference in axle speeds increases.

7. A differential for an automotive vehicle comprising, a rotatable housing having two sets of gear chambers therein, rotatable axles extending into the housing, driven gears positioned in one set of chambers and secured to the ends of the axles, pinion gears rotatably carried by the housing in the other set of chambers and meshing with the driven gears, reservoir means for supplying liquid to the gear chambers including a stationary annular reservoir positioned to slide on the housing and an intermediate reservoir connecting the annular reservoir to the gear chambers, an inner integral block separating the chambers from each other so that high and low pressure areas are created in the areas of engagement and disengagement of the gear teeth, and means connecting the high pressure areas to the lower pressure areas.

8. A differential according to claim 7 wherein said connecting means includes a fixed orifice to provide differential action at normal driving speeds and responsive to the difference in pressure between the areas of engagement and the areas of disengagement.

References Cited in the file of this patent

UNITED STATES PATENTS

| | | |
|---|---|---|
| 1,466,320 | West | Aug. 28, 1923 |
| 2,463,091 | Dortort | Mar. 1, 1949 |
| 2,627,190 | Bottcher | Feb. 3, 1953 |
| 2,655,055 | Bottcher | Oct. 13, 1953 |